(12) United States Patent
Sasadai

(10) Patent No.: US 9,473,658 B2
(45) Date of Patent: *Oct. 18, 2016

(54) ELECTRONIC DEVICE THAT PROCESSES DATA RECEIVED FROM AN EXTERNAL APPARATUS

(71) Applicant: KYOCERA Document Solutions Inc., Osaka (JP)

(72) Inventor: Koji Sasadai, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/882,948

(22) Filed: Oct. 14, 2015

(65) Prior Publication Data

US 2016/0080599 A1  Mar. 17, 2016

Related U.S. Application Data

(62) Division of application No. 14/529,256, filed on Oct. 31, 2014, now Pat. No. 9,191,538.

(30) Foreign Application Priority Data

Oct. 31, 2013 (JP) ................................. 2013-227427

(51) Int. Cl.
*H04N 1/04* (2006.01)
*H04N 1/00* (2006.01)
(Continued)

(52) U.S. Cl.
CPC ........ *H04N 1/00891* (2013.01); *G06F 1/3209* (2013.01); *G06F 1/3293* (2013.01);
(Continued)

(58) Field of Classification Search
CPC ................. H04N 1/00896; H04N 2201/0094; H04N 1/00204; H04N 1/00222; H04N 1/00233; H04N 1/00885; H04N 1/00891; H04N 1/32765; H04N 1/32795; H04N 2201/0015; H04N 2201/0034; H04N 2201/0039; H04N 2201/00

USPC .............. 713/300, 320, 324; 358/1.13, 1.14, 358/1.15; 370/278; 710/310

See application file for complete search history.

(56) References Cited

U.S. PATENT DOCUMENTS 5,758,040 A  5/1998  Ichimura et al.
5,832,190 A  11/1998  Terajima et al.
(Continued)

FOREIGN PATENT DOCUMENTS

EP  2306267 A2  4/2011
JP  2006-338524 A  12/2006
(Continued)

OTHER PUBLICATIONS

Office Action dated Feb. 4, 2016 from Japan Patent Office re Japanese Appl. No. 2013-227427.
(Continued)

*Primary Examiner* — Negussie Worku
(74) *Attorney, Agent, or Firm* — McDonnell Boehnen Hulbert & Berghoff LLP

(57) ABSTRACT

An electronic device may include a main system that can operate in a normal state and an energy-saving state, a data retaining unit that stores data, and a subsystem that may execute transmission and reception of data to and from an external apparatus. While the main system is in the energy-saving state, if the subsystem receives main dedicated specific data of pieces of main dedicated data required to be processed by the main system, the subsystem may store the main dedicated specific data. While the main system is in the energy-saving state, if the subsystem receives main dedicated data other than the main dedicated specific data from an external apparatus, the subsystem may transition the main system to the normal state and cause the main system to process the main dedicated specific data stored and the main dedicated data other than the main dedicated specific data.

5 Claims, 7 Drawing Sheets

(51) Int. Cl.
*G06K 15/00* (2006.01)
*G06F 3/12* (2006.01)
*G06F 1/32* (2006.01)
*G06K 15/02* (2006.01)

(52) U.S. Cl.
CPC .......... *G06F3/1221* (2013.01); *G06F 3/1229* (2013.01); *G06F 3/1236* (2013.01); *G06F 3/1285* (2013.01); *G06K 15/1805* (2013.01); *G06K 15/4055* (2013.01); *H04N 1/00204* (2013.01); *H04N 1/00896* (2013.01); *G06F 1/3284* (2013.01); *H04N 2201/0094* (2013.01); *Y02B 60/121* (2013.01); *Y02B 60/1267* (2013.01)

(56) References Cited

U.S. PATENT DOCUMENTS

| | | | |
|---|---|---|---|
| 5,914,538 A | 6/1999 | Kurosawa et al. | |
| 7,383,448 B2* | 6/2008 | Kohara | G06F 1/3203 713/300 |
| 8,170,437 B2 | 5/2012 | Sugimoto | |
| 8,294,910 B2 | 10/2012 | Hirai | |
| 8,322,609 B2* | 12/2012 | Hashimoto | B41J 29/393 235/375 |
| 8,682,196 B2* | 3/2014 | Tanaka | G03G 15/5004 399/70 |
| 8,724,127 B2 | 5/2014 | Tani et al. | |
| 8,773,719 B2 | 7/2014 | Baba et al. | |
| 9,191,538 B2* | 11/2015 | Sasadai | H04N 1/00891 |
| 2005/0047356 A1* | 3/2005 | Fujii | G06F 1/3209 370/311 |
| 2006/0274348 A1 | 12/2006 | Suzuki | |
| 2007/0183107 A1 | 8/2007 | Okada | |
| 2011/0019225 A1 | 1/2011 | Jung | |
| 2011/0040992 A1* | 2/2011 | Mizunashi | H04L 12/10 713/310 |
| 2011/0078464 A1 | 3/2011 | Yokomizo | |
| 2012/0229831 A1 | 9/2012 | Kuroishi et al. | |
| 2012/0246502 A1 | 9/2012 | Koga | |
| 2013/0003095 A1* | 1/2013 | Ohata | H04N 1/00896 358/1.13 |
| 2013/0010335 A1 | 1/2013 | Baba et al. | |
| 2013/0057894 A1 | 3/2013 | Narushima et al. | |
| 2013/0166935 A1* | 6/2013 | Imaizumi | G06F 1/3268 713/323 |
| 2014/0006583 A1* | 1/2014 | Sugimoto | H04W 4/20 709/223 |
| 2014/0104636 A1 | 4/2014 | Baba | |
| 2014/0176986 A1 | 6/2014 | Tomofuji | |
| 2014/0198337 A1* | 7/2014 | Nakajima | G06K 15/4055 358/1.14 |
| 2015/0116749 A1* | 4/2015 | Sasadai | H04N 1/00891 358/1.13 |
| 2015/0147080 A1 | 5/2015 | Uchiyama | |
| 2015/0156364 A1 | 6/2015 | Fujita | |
| 2015/0212767 A1* | 7/2015 | Sasadai | G06F 3/1221 358/1.15 |
| 2015/0378647 A1* | 12/2015 | Sakabe | G06F 3/1229 358/1.14 |

FOREIGN PATENT DOCUMENTS

| | | |
|---|---|---|
| JP | 2010-162792 A | 7/2010 |
| JP | 2011-68038 A | 4/2011 |
| JP | 2012-006196 A | 1/2012 |
| JP | 2012-203464 A | 10/2012 |

OTHER PUBLICATIONS

Office Action dated Aug. 4, 2016 from Japan Patent Office re Japanese Appl. No. 2013-227427.

* cited by examiner

31b

| OID | DATA | |
|---|---|---|
| | TYPE | VALUE |
| 1.3.6.1.2.1.2.2.1.1.1 | INTEGER | 1 |
| 1.2.6.1.2.1.2.2.1.2.1 | STRING | eth0 |
| 1.3.6.1.2.1.2.2.1.3.1 | INTEGER | 6 |
| 1.2.6.1.2.1.2.2.1.4.1 | INTEGER | 1500 |
| 1.3.6.1.2.1.2.2.1.5.1 | Gauge32 | 0 |
| . . . | . . . | . . . |

Fig. 2

ELECTRONIC DEVICE THAT PROCESSES DATA RECEIVED FROM AN EXTERNAL APPARATUS

REFERENCE TO RELATED APPLICATIONS

This application is a divisional application of U.S. patent application Ser. No. 14/529,256, filed in the United States Patent and Trademark Office on Oct. 31, 2014, which is based upon and claims the benefit of priority from the corresponding Japanese Patent Application No. 2013-227427, filed in the Japan Patent Office on Oct. 31, 2013, the entire contents of which are incorporated herein by reference.

FIELD

The present disclosure relates to an electronic device including a main system that has a normal state and an energy-saving state in which less energy is consumed than that in the normal state, and a subsystem that executes transmission and reception of data to and from an external apparatus.

BACKGROUND

A typical electronic device may include a normal state and an energy-saving state in which less energy is consumed than that in the normal state. When a subsystem receives main dedicated data to be processed by the main system in the energy-saving state from an external apparatus, the typical electronic device transitions the main system to the normal state.

SUMMARY

An electronic device according to an embodiment of the present disclosure includes a main system, a data retaining unit, a network communication unit, and a subsystem. The main system operates in (i) a normal state or (ii) an energy saving state, where energy consumed by the electronic device in the energy-saving state is less than energy consumed by the electronic device in the normal state. The data retaining unit stores data. The network communication unit communicates with an external apparatus. The subsystem performs a set of operations. The operations include receiving, via the network communication unit, a packet from an external apparatus. The operations also include providing the received packet to the main system to process the received packet. The operations further include receiving a response packet generated by the main system as a result of processing the received packet. Additionally, the operations include, upon receiving the response packet, transmitting the response packet to the external apparatus via the network communication unit. Further, the operations include determining whether the transmitted response packet corresponds to main dedicated specific data. The operations also include, based on determining that the transmitted response packet does not correspond to main dedicated specific data, storing response generation information associated with the transmitted response packet in the data retaining unit. The operations yet further include determining whether the transmitted response packet corresponds to a command to transition the main system from the normal state to the energy saving state. In addition, the operations include, based on determining that the transmitted response packet corresponds to a command to transition the main system from the normal state to the energy saving state, transitioning the main system from the normal state to the energy saving state.

A non-transitory computer-readable recording medium may have stored thereon instructions that, upon execution by at least one processor, perform a set of operations. The operations include receiving, via the network communication unit, a packet from an external apparatus. The operations also include providing the received packet to the main system to process the received packet. The operations further include receiving a response packet generated by the main system as a result of processing the received packet. Additionally, the operations include, upon receiving the response packet, transmitting the response packet to the external apparatus via the network communication unit. Further, the operations include determining whether the transmitted response packet corresponds to main dedicated specific data. The operations also include, based on determining that the transmitted response packet does not correspond to main dedicated specific data, storing response generation information associated with the transmitted response packet in the data retaining unit. The operations yet further include determining whether the transmitted response packet corresponds to a command to transition the main system from the normal state to the energy saving state. In addition, the operations include, based on determining that the transmitted response packet corresponds to a command to transition the main system from the normal state to the energy saving state, transitioning the main system from the normal state to the energy saving state.

A method according to an embodiment of the present disclosure involves performing a set of operations. The operations include receiving, via the network communication unit, a packet from an external apparatus. The operations also include providing the received packet to the main system to process the received packet. The operations further include receiving a response packet generated by the main system as a result of processing the received packet. Additionally, the operations include, upon receiving the response packet, transmitting the response packet to the external apparatus via the network communication unit. Further, the operations include determining whether the transmitted response packet corresponds to main dedicated specific data. The operations also include, based on determining that the transmitted response packet does not correspond to main dedicated specific data, storing response generation information associated with the transmitted response packet in the data retaining unit. The operations yet further include determining whether the transmitted response packet corresponds to a command to transition the main system from the normal state to the energy saving state. In addition, the operations include, based on determining that the transmitted response packet corresponds to a command to transition the main system from the normal state to the energy saving state, transitioning the main system from the normal state to the energy saving state.

Additional features and advantages are described herein, and will be apparent from the following detailed description and the figures.

BRIEF DESCRIPTION OF THE DRAWINGS

All drawings are intended to illustrate some aspects and examples of the present disclosure. The drawings described are only schematic and are non-limiting, and are not necessarily drawn to scale.

FIG. 2 illustrates an example of an SNMP response generation information table illustrated in FIG. 1;

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

An embodiment of the present disclosure will be described below with reference to the drawings.

First, the configuration of a multifunction peripheral (MFP) serving as an electronic device according to the embodiment will be described.

Figure 1:
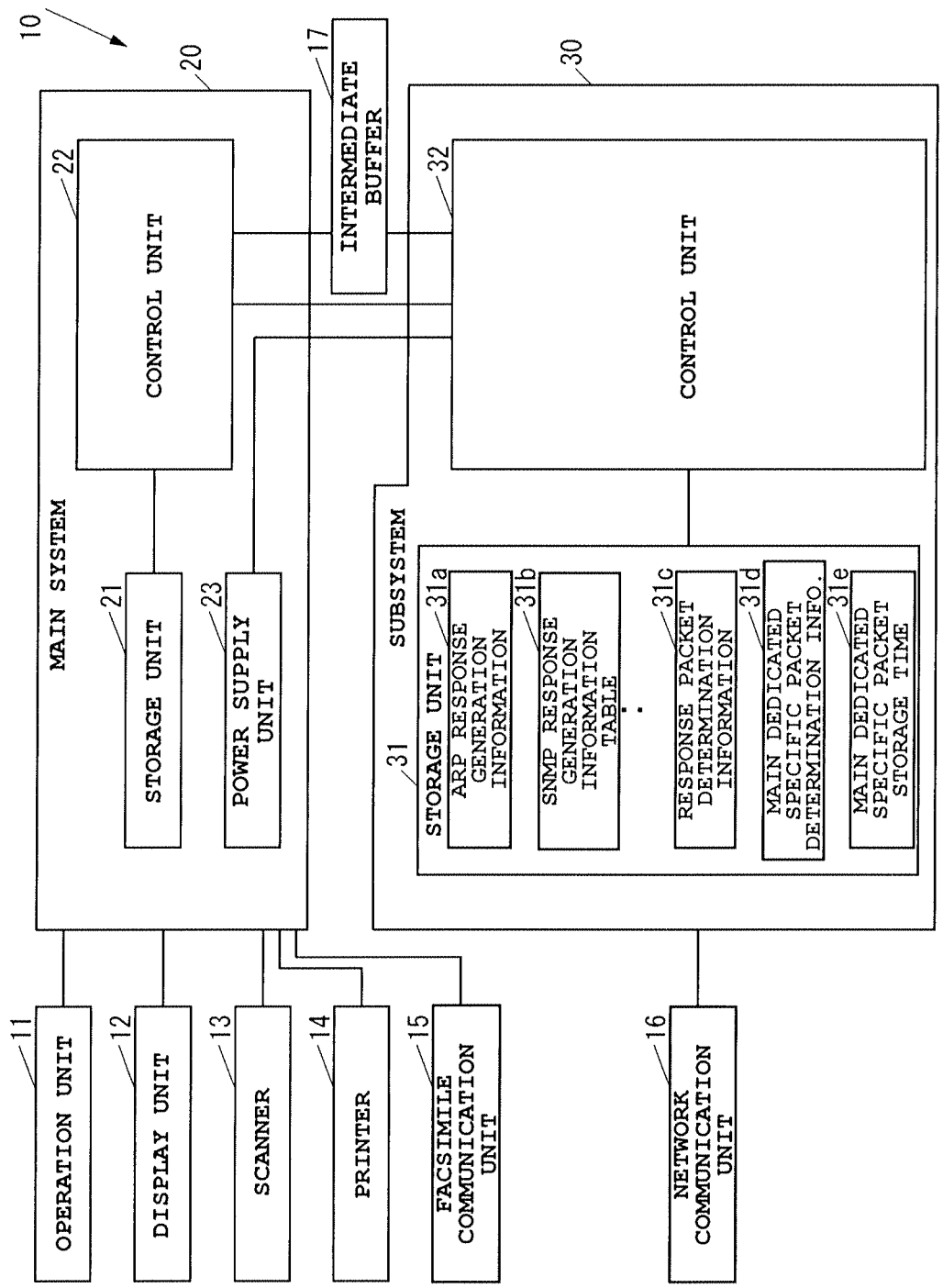
FIG. 1 illustrates the configuration of a multifunction peripheral (MFP) according to an embodiment of the present disclosure.

FIG. 1 illustrates the configuration of an MFP 10 according to the embodiment.

As illustrated in FIG. 1, the MFP 10 includes an operation unit 11, a display unit 12, a scanner 13, a printer 14, a facsimile communication unit 15, a network communication unit 16, an intermediate buffer 17, a main system 20, and a subsystem 30. The operation unit 11 is an input device, which may include one or more buttons, through which a user inputs various operations. The display unit 12 is a device, such as a liquid crystal display (LCD), which displays various pieces of information. The scanner 13 is a device that scans an image from a document. The printer 14 is a device that executes printing on a recording medium, such as paper. The facsimile communication unit 15 is a device that performs facsimile communication with an external facsimile apparatus via a communication line, such as a public telephone line. The network communication unit 16 is a device that performs communication with an external apparatus over a network, such as a local area network (LAN) or the Internet. The intermediate buffer 17 is a storage device, such as a random access memory (RAM), an electrically erasable programmable read only memory (EEPROM), or a hard disk drive (HDD). The main system 20 controls the entire MFP 10, including the various units connected to main system 20. The subsystem 30 executes transmission and reception of data to and from an external apparatus via the network communication unit 16.

The intermediate buffer 17 is a storage device for storing data to be input from the subsystem 30 to the main system 20, and may be the same as or similar to a data retaining unit of the present disclosure.

The main system 20 may include, among other states, a normal state and an energy-saving state in which less energy is consumed than that in the normal state. The main system 20 can make a transition from the normal state to the energy-saving state and a return from the energy-saving state to the normal state over a certain period of time (for example, 1 millisecond to 10 milliseconds).

The main system 20 includes a storage unit 21, a control unit 22, and a power supply unit 23. The storage unit 21 is a non-volatile storage device, such as an EEPROM or HDD, which stores various pieces of data. The control unit 22 controls, among other units of MFP 10, the entire main system 20. The power supply unit 23 supplies power to each unit of the main system 20.

The control unit 22 includes, for example, a central processing unit (CPU), a read-only memory (ROM) that may store a program and various pieces of data, and a RAM that may be used as a work area for the CPU. The CPU executes a program stored in the ROM.

The subsystem 30 may receive, in response to requesting information from external apparatus, information request data from that external apparatus via the network communication unit 16. The information request data may be in form of information request packets that comply with certain communication protocols (e.g. address resolution protocol (ARP) or simple network management protocol (SNMP)). In addition, the system 30 may transmit response data to an external apparatus via the network communication unit 16 upon receiving the information request data. The response data may be in the form of response packets that comply with certain communication protocols (e.g. ARP or SNMP).

The subsystem 30 includes a storage unit 31 and a control unit 32. The storage unit 31 is a storage device, such as an EEPROM or HDD, which stores various pieces of data. The control unit 32 controls the entire subsystem 30.

The storage unit 31 may store ARP response generation information 31a and an SNMP response generation information table 31b. The ARP response generation information 31a represents response generation information used for generating a response packet to an ARP information request packet. The SNMP response generation information table 31b contains response generation information used for generating a response packet to an SNMP information request packet. Furthermore, the storage unit 31 can store response generation information used for generating response packets to information request packets of various communication protocols in addition to the ARP and the SNMP.

The ARP response generation information 31a is composed of an Internet protocol (IP) address of the MFP 10 and a media access control (MAC) address (Ethernet (registered trademark) address) of the MFP 10.

FIG. 2 illustrates an example of the SNMP response generation information table 31b.

As illustrated in FIG. 2, the SNMP response generation information table 31b contains combinations of object identifiers (OIDs) and data associated with each OID. The OID represents an identifier for identifying an object (e.g. an object that includes individual management information) stored in a management information base (MIB) in the SNMP. Each combination of an OID and data may be referred to herein as "response generation information."

Data is composed of a type, such as INTEGER (an integer type) or STRING (a character string type), and a value, such as "1" or "eth0".

As illustrated in FIG. 1, the storage unit 31 may store response packet determination information 31c and main dedicated specific packet determination information 31d. The control unit 32 may determine, based on the response packet determination information 31c, whether or not a response packet provided to the control unit 32 from the main system 20 is a main dedicated packet. The control unit 32 may also determine, based on the main dedicated specific packet determination information 31d, whether or not a response packet provided to the control unit 32 from the main system 20 is a specific type of main dedicated packet.

Here, the main dedicated packet is, for example, a packet containing a large amount of data.

Furthermore, the main dedicated specific packet is, for example, a main dedicated packet for which a timeout period that elapses before a response is made is long. A main dedicated packet has been determined, based on a communication protocol specification, to be a main dedicated packet for which a timeout period that elapses before a response is made is long, or not to be the main dedicated packet. Thus, the main dedicated specific packet determination information 31d may be information containing a communication protocol for determining that a main dedicated packet is a main dedicated specific packet.

In addition, the storage unit 31 can store a main dedicated specific packet storage time 31e representing a time at which a main dedicated specific packet has been stored in the intermediate buffer 17.

The control unit 32 includes, for example, a CPU, a ROM that stores a program and various pieces of data, and a RAM that is used as a work area for the CPU. The CPU executes a program stored in the ROM.

Next, operations performed by the MFP 10 will be described.

Figure 3:
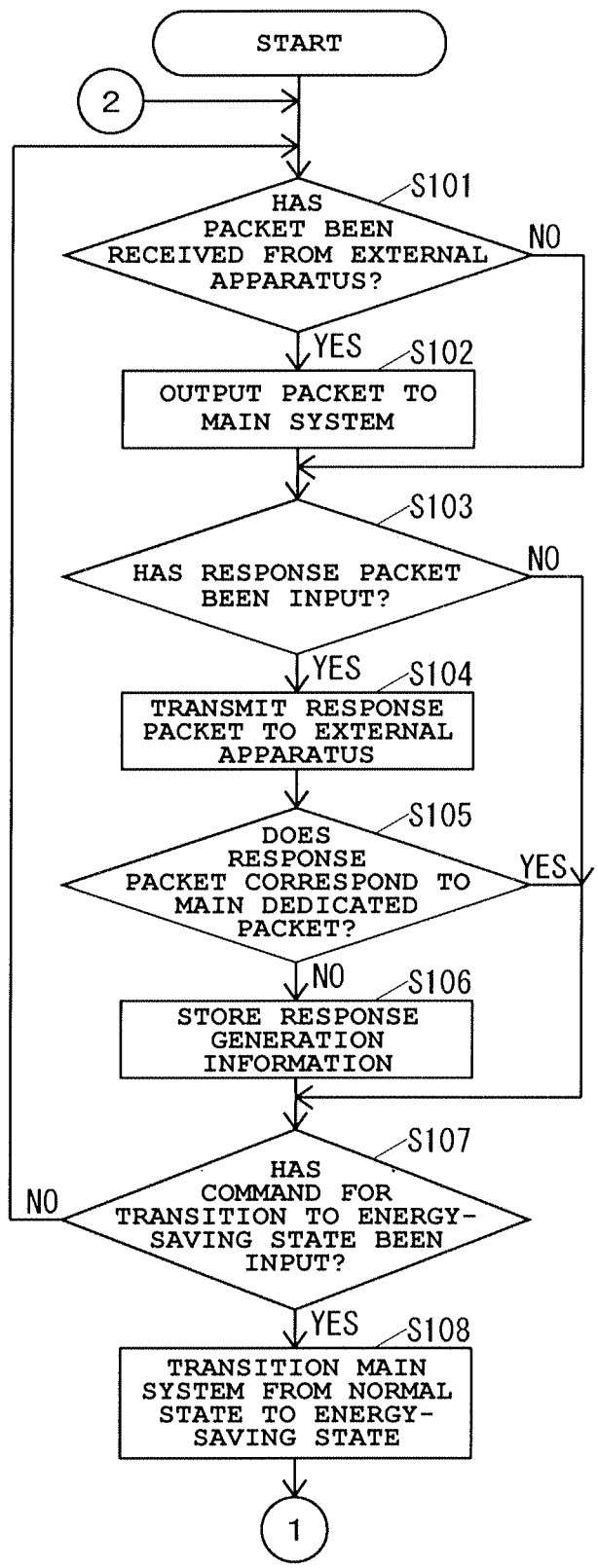
FIG. 3 illustrates operations performed by a subsystem illustrated in FIG. 1.
Figure 4:
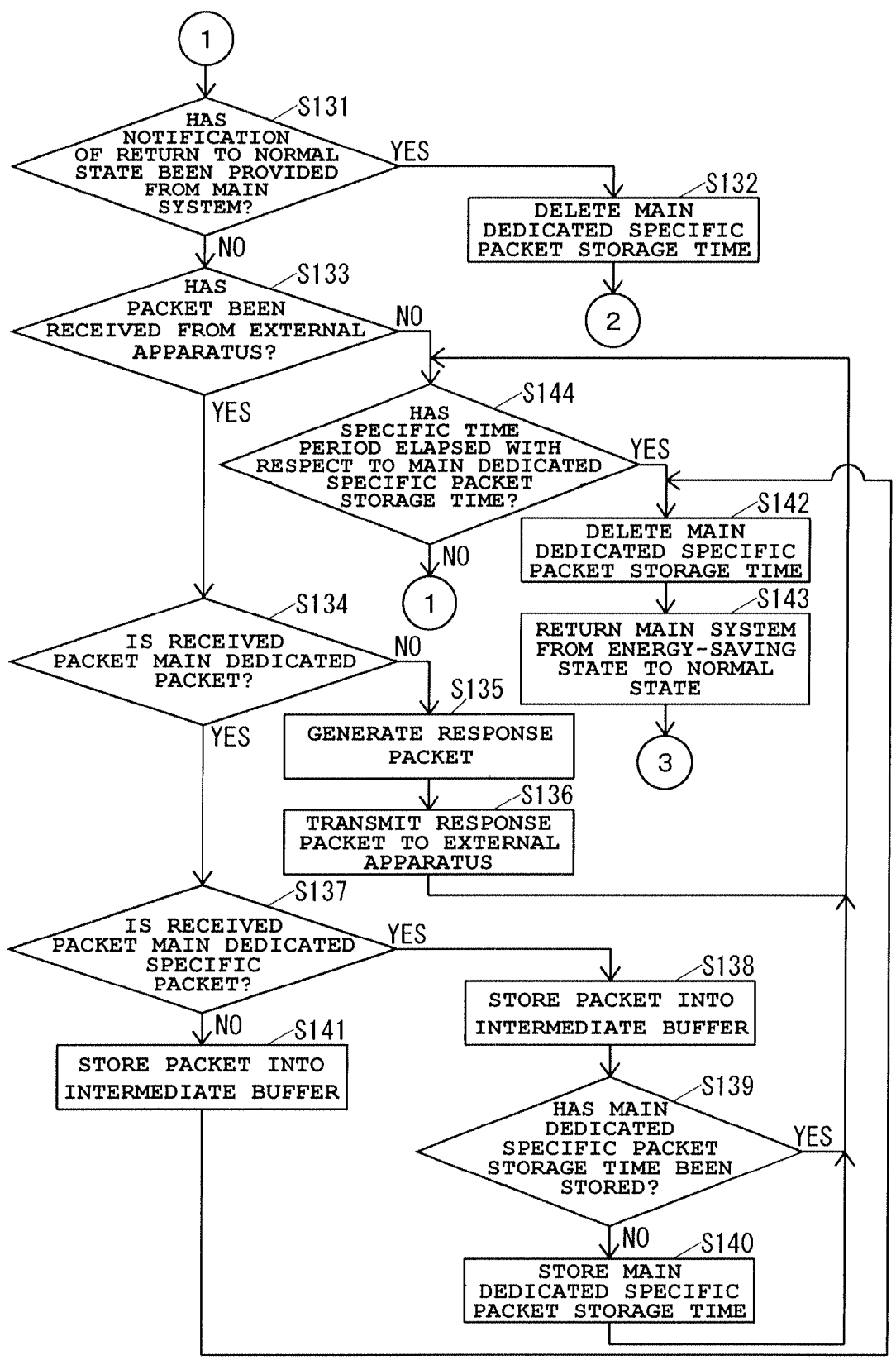
FIG. 4 illustrates operations following the operations illustrated in FIG. 3.
Figure 5:
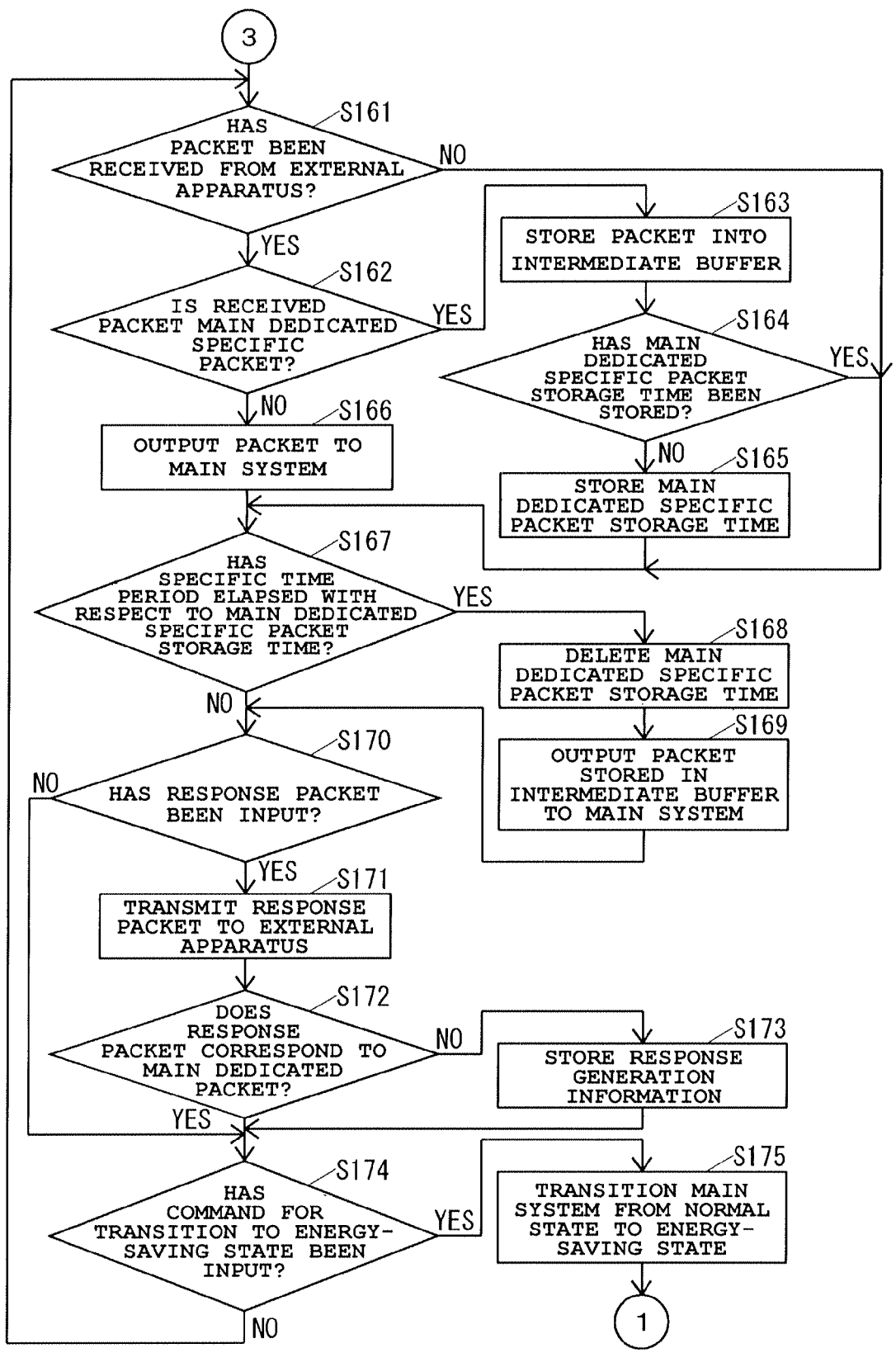
FIG. 5 illustrates operations following the operations illustrated in FIG. 4.

FIG. 3 is a flowchart illustrating operations performed by the subsystem 30. FIG. 4 illustrates operations following the operations illustrated in FIG. 3. FIG. 5 illustrates operations following the operations illustrated in FIG. 4.

When the MFP 10 is activated, the control unit 32 of the subsystem 30 starts the operations illustrated in FIGS. 3 to 5. At a point in time when the MFP 10 is activated, each unit has been supplied with power by the power supply unit 23, and the main system 20 is in the normal state.

As illustrated in FIGS. 3 to 5, the control unit 32 of the subsystem 30 determines whether or not a packet has been received from an external apparatus via the network communication unit 16 (S101).

When the control unit 32 determines that a packet has been received from an external apparatus in S101, the control unit 32 outputs the received packet to the main system 20 (S102).

Here, when the packet output from the subsystem 30 is input, the control unit 22 of the main system 20 processes the input packet. Then, when the packet input from the subsystem 30 is an information request packet and the control unit 22 generates a response packet to the information request packet, the control unit 22 outputs the generated response packet to the subsystem 30. The control unit 22 sets a source of the information request packet as a destination of the response packet.

When the control unit 32 of the subsystem 30 determines that no packet has been received from an external apparatus in S101, or when the process of S102 ends, the control unit 32 determines whether or not the response packet output from the main system 20 has been input (S103).

When the control unit 32 determines that the response packet has been input from the main system 20 in S103, the control unit 32 transmits the response packet input from the main system 20 to the external apparatus via the network communication unit 16 (S104).

Subsequently, the control unit 32 determines, based on the response packet determination information 31c stored on the storage unit 31, whether or not the response packet transmitted in S104 is a response packet to a main dedicated packet (S105).

When the control unit 32 determines that the response packet is not a response packet to a main dedicated packet in S105, the control unit 32 causes the storage unit 31 to store response generation information based on the response packet transmitted in S104 (S106).

For example, if the response packet transmitted in S104 is an ARP response packet, the control unit 32 causes the storage unit 31 to store, as the ARP response generation information 31a, an IP address and a MAC address of a source that are contained in the response packet. Furthermore, if the response packet transmitted in S104 is an SNMP response packet, the control unit 32 causes the storage unit 31 to store, as one of pieces of response generation information in the SNMP response generation information table 31b, an OID, and the type and a value of data for the OID that are contained in the response packet.

When the control unit 32 determines that the response packet has not been input from the main system 20 in S103 or determines that the response packet is a response packet to a main dedicated packet in S105, or when the process of S106 ends, the control unit 32 determines whether or not a command for a transition to the energy-saving state has been input from the main system 20 (S107).

As described later, if a specific condition is satisfied, for example, if a specific state in which, for example, no operation is input via the operation unit 11 continues for not less than a certain time period, the control unit 22 of the main system 20 performs a self-refresh process of migrating data stored in the RAM of the control unit 22 to the storage unit 21, and then outputs a command for a transition to the energy-saving state to the subsystem 30.

When the control unit 32 of the subsystem 30 determines that a command for a transition to the energy-saving state has not been input from the main system 20 in S107, the control unit 32 executes the process of S101.

When the control unit 32 determines that a command for a transition to the energy-saving state has been input from the main system 20 in S107, the control unit 32 causes the power supply unit 23 of the main system 20 to end supplying power to each unit of the main system 20 and thereby transitions the main system 20 from the normal state to the energy-saving state (S108).

Subsequently, the control unit 32 determines whether or not a notification of a return to the normal state has been provided from the main system 20 (S131).

Here, if the main system 20 returns from the energy-saving state to the normal state due to a cause other than an instruction from the subsystem 30, the control unit 22 of the main system 20 notifies the subsystem 30 of a return to the normal state. A cause other than an instruction from the subsystem 30 is, for example, an operation for a return from the energy-saving state to the normal state that is input via the operation unit 11.

When the control unit 32 of the subsystem 30 determines that a notification of a return to the normal state has been provided from the main system 20 in S131, the control unit 32 deletes a main dedicated specific packet storage time 31*e* stored on the storage unit 31 (S132). If no main dedicated specific packet storage time 31*e* has been stored on the storage unit 31 in the process of S132, the control unit 32 ends the process of S132 without performing any operation.

When the process of S132 ends, the control unit 32 executes the process of S101.

When the control unit 32 determines that a notification of a return to the normal state has not been provided from the main system 20 in S131, the control unit 32 determines whether or not a packet has been received from an external apparatus via the network communication unit 16 (S133).

When the control unit 32 determines that a packet has been received from an external apparatus in S133, the control unit 32 determines, based on the response generation information stored on the storage unit 31, whether or not the received packet is a main dedicated packet (S134). That is, when the control unit 32 determines, based on the response generation information stored on the storage unit 31, that the subsystem 30 can generate a response packet to the packet determined to have been received from an external apparatus in S133, the control unit 32 determines that the received packet is not a main dedicated packet. On the other hand, when the control unit 32 determines, based on the response generation information stored on the storage unit 31, that the subsystem 30 cannot generate a response packet to the packet determined to have been received from an external apparatus in S133, the control unit 32 determines that the received packet is a main dedicated packet. Here, if response generation information that is appropriate to both a communication protocol of the packet determined to have been received from an external apparatus in S133 and the content of the packet has not been stored on the storage unit 31, the control unit 32 determines that the subsystem 30 cannot generate a response packet.

For example, if the packet determined to have been received from an external apparatus in S133 is an ARP information request packet, the control unit 32 determines, based on the IP address and the MAC address in the ARP response generation information 31*a*, whether or not the subsystem 30 can generate an ARP response packet to the information request packet. Furthermore, if the packet determined to have been received from an external apparatus in S133 is an SNMP information request packet, the control unit 32 determines, based on a combination of an OID, and the type and a value of data in the SNMP response generation information table 31*b*, whether or not the subsystem 30 can generate an SNMP response packet to the information request packet.

When the control unit 32 determines that the received packet is not a main dedicated packet in S134, the control unit 32 generates, based on the response generation information stored on the storage unit 31, a response packet to the packet determined to have been received from an external apparatus in S133 (S135). The control unit 32 sets a source of the packet determined to have been received from an external apparatus in S133 as a destination of the response packet.

For example, if the packet determined to have been received from an external apparatus in S133 is an ARP information request packet, the control unit 32 generates an ARP response packet based on the IP address and the MAC address in the ARP response generation information 31*a*. Furthermore, if the packet determined to have been received from an external apparatus in S133 is an SNMP information request packet, the control unit 32 generates an SNMP response packet based on a combination of an OID, and the type and a value of data in the SNMP response generation information table 31*b*.

When the process of S135 ends, the control unit 32 transmits the response packet generated in S135 to the external apparatus via the network communication unit 16 (S136).

When the control unit 32 determines that the received packet is a main dedicated packet in S134, the control unit 32 determines, based on the main dedicated specific packet determination information 31*d* stored on the storage unit 31, whether or not the packet determined to have been received from an external apparatus in S133 is a main dedicated specific packet (S137).

When the control unit 32 determines that the packet determined to have been received from an external apparatus in S133 is a main dedicated specific packet in S137, the control unit 32 causes the intermediate buffer 17 to store the packet (S138).

Subsequently, the control unit 32 determines whether or not a main dedicated specific packet storage time 31*e* has been stored on the storage unit 31 (S139).

When the control unit 32 determines that no main dedicated specific packet storage time 31*e* has been stored on the storage unit 31 in S139, the control unit 32 causes the storage unit 31 to store a current time as a main dedicated specific packet storage time 31*e* (S140).

When the control unit 32 determines that the packet determined to have been received from an external apparatus in S133 is not a main dedicated specific packet in S137, the control unit 32 causes the intermediate buffer 17 to store the packet (S141), and deletes a main dedicated specific packet storage time 31*e* stored on the storage unit 31 (S142). If no main dedicated specific packet storage time 31*e* has been stored on the storage unit 31 in the process of S142, the control unit 32 ends the process of S142 without performing any operation.

When the process of S142 ends, the control unit 32 causes the power supply unit 23 of the main system 20 to start supplying power to each unit of the main system 20 and thereby returns the main system 20 from the energy-saving state to the normal state (S143).

When the control unit 32 determines that no packet has been received from an external apparatus in S133, when the process of S136 ends, when the control unit 32 determines that a main dedicated specific packet storage time 31*e* has been stored on the storage unit 31 in S139, or when the process of S140 ends, the control unit 32 determines whether or not a current time is a time when a specific time period has elapsed with respect to the main dedicated specific packet storage time 31*e* stored on the storage unit 31 (S144). Here, the specific time period is, for example, a few seconds. If no main dedicated specific packet storage time 31*e* has been stored on the storage unit 31 in the process of S144, the control unit 32 determines that the specific time period has not elapsed.

When the control unit 32 determines that the specific time period has not elapsed in S144, the control unit 32 executes the process of S131.

When the control unit 32 determines that the specific time period has elapsed in S144, the control unit 32 executes the process of S142.

When the process of S143 ends, the control unit 32 of the subsystem 30 determines whether or not a packet has been received from an external apparatus via the network communication unit 16 (S161).

When the control unit 32 determines that a packet has been received from an external apparatus in S161, the control unit 32 determines, based on the main dedicated specific packet determination information 31d stored on the storage unit 31, whether or not the packet determined to have been received from an external apparatus in S161 is a main dedicated specific packet (S162).

When the control unit 32 determines that the packet determined to have been received from an external apparatus in S161 is a main dedicated specific packet in S162, the control unit 32 causes the intermediate buffer 17 to store the packet (S163).

Subsequently, the control unit 32 determines whether or not a main dedicated specific packet storage time 31e has been stored on the storage unit 31 (S164).

When the control unit 32 determines that no main dedicated specific packet storage time 31e has been stored on the storage unit 31 in S164, the control unit 32 causes the storage unit 31 to store a current time as a main dedicated specific packet storage time 31e (S165).

When the control unit 32 determines that the packet determined to have been received from an external apparatus in S161 is not a main dedicated specific packet in S162, the control unit 32 outputs the packet to the main system 20 (S166).

When the control unit 32 determines that no packet has been received from an external apparatus in S161 or determines that a main dedicated specific packet storage time 31e has been stored on the storage unit 31 in S164, or when the process of S165 or S166 ends, the control unit 32 determines whether or not a current time is a time when a specific time period has elapsed with respect to the main dedicated specific packet storage time 31e stored on the storage unit 31 (S167). Here, the specific time period is, for example, a few seconds. If no main dedicated specific packet storage time 31e has been stored on the storage unit 31 in the process of S167, the control unit 32 determines that the specific time period has not elapsed.

When the control unit 32 determines that the specific time period has elapsed in S167, the control unit 32 deletes the main dedicated specific packet storage time 31e stored on the storage unit 31 (S168), and outputs the packet stored in the intermediate buffer 17 to the main system 20 (S169).

When the control unit 32 determines that the specific time period has not elapsed in S167, or when the process of S169 ends, the control unit 32 executes processes of S170 to S174, as in the processes of S103 to S107.

When the control unit 32 determines that a command for a transition to the energy-saving state has not been input from the main system 20 in S174, the control unit 32 executes the process of S161.

When the control unit 32 determines that a command for a transition to the energy-saving state has been input from the main system 20 in S174, the control unit 32 causes the power supply unit 23 of the main system 20 to end supplying power to each unit of the main system 20 and thereby transitions the main system 20 from the normal state to the energy-saving state (S175), and executes the process of S131.

Figure 6:
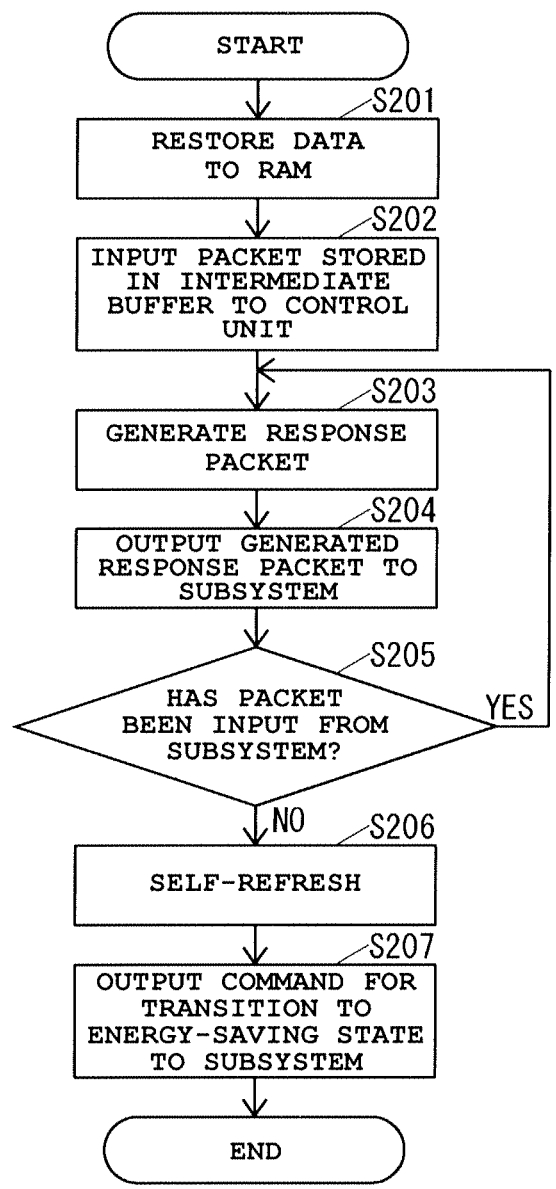
FIG. 6 illustrates operations performed by a main system if the main system returns to a normal state based on an instruction from the subsystem.

FIG. 6 illustrates operations performed by the main system 20 if the main system 20 returns to the normal state based on an instruction from the subsystem 30. That is, when the control unit 22 of the main system 20 is returned to the normal state by the process of S143 executed by the subsystem 30, the control unit 22 executes the operations illustrated in FIG. 6.

As illustrated in FIG. 6, the control unit 22 of the main system 20 restores the data that has been migrated to the storage unit 21 to its own RAM (S201).

Then, a packet stored in the intermediate buffer 17 is input to the control unit 22 (S202). A packet to be input in S202 is the packet that has been stored in the intermediate buffer 17 in any of S138, S141, and S163.

Then, the control unit 22 generates a response packet to the packet input in S202 (S203), and outputs the generated response packet to the subsystem 30 (S204). A response packet to be output to the subsystem 30 in S204 is a response packet on which a determination in S170 is to be made.

Subsequently, the control unit 22 determines whether or not a packet has been input from the subsystem 30 (S205). A packet on which a determination as to whether or not it has been input is to be made in S205 is the packet output by the subsystem 30 in S166 or S169.

When the control unit 22 determines that a packet has been input from the subsystem 30 in S205, the control unit 22 generates a response packet to the packet determined to have been input from the subsystem 30 in S205 (S203).

When the control unit 22 determines that no packet has been input from the subsystem 30 in S205, the control unit 22 performs a self-refresh process of migrating the data stored in its own RAM to the storage unit 21 (S206), then outputs a command for a transition to the energy-saving state to the subsystem 30 (S207), and ends the operations illustrated in FIG. 6. A command for a transition to be output to the subsystem 30 in S207 is a command for a transition on which a determination in S174 is to be made.

Figure 7:
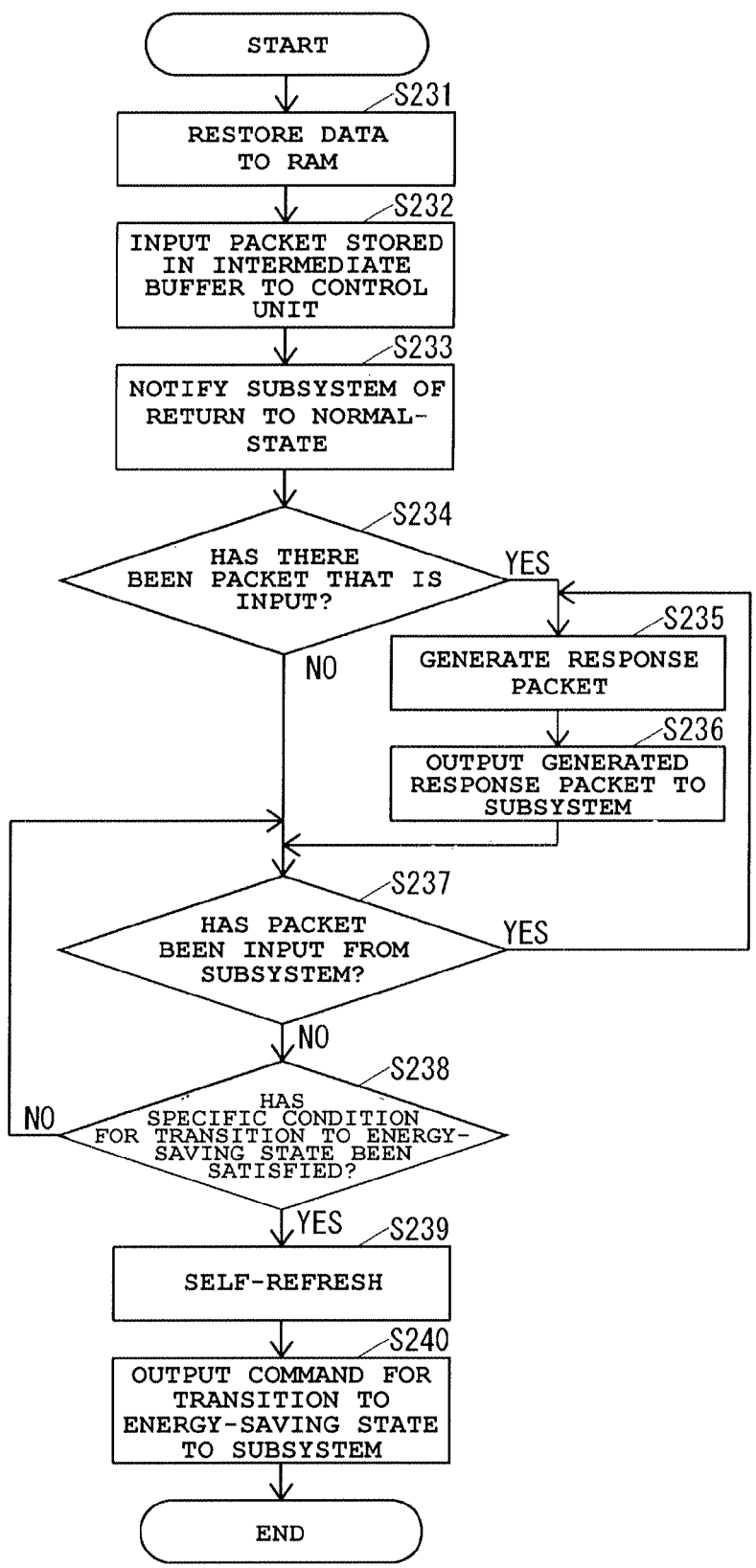
FIG. 7 illustrates operations performed by the main system if the main system returns to the normal state due to a cause other than an instruction from the subsystem.

FIG. 7 is a flowchart illustrating operations performed by the main system 20 if the main system 20 returns to the normal state due to a cause other than an instruction from the subsystem 30.

As illustrated in FIG. 7, the control unit 22 of the main system 20 restores the data that has been migrated to the storage unit 21 to its own RAM (S231).

Then, a packet stored in the intermediate buffer 17 is input to the control unit 22 (S232). A packet to be input in S232 is the packet that has been stored in the intermediate buffer 17 in any of S138, S141, and S163.

Then, the control unit 22 notifies the subsystem 30 of a return to the normal-state (S233). A notification in S233 is a notification on which a determination in S131 is to be made.

Then, the control unit 22 determines whether or not there has been the packet input in S232 (S234).

When the control unit 22 determines that there has been the packet in S234, the control unit 22 generates a response packet to the packet input in S232 (S235), and outputs the generated response packet to the subsystem 30 (S236). A response packet to be output to the subsystem 30 in S236 is a response packet on which a determination in S103 is to be made.

When the control unit 22 determines that there has not been the packet in S234, or when the process of S236 ends, the control unit 22 determines whether or not a packet has been input from the subsystem 30 (S237). A packet on which a determination as to whether or not it has been input is to be made in S237 is the packet output by the subsystem 30 in S102.

When the control unit 22 determines that a packet has been input from the subsystem 30 in S237, the control unit 22 generates a response packet to the packet determined to have been input from the subsystem 30 in S237 (S235).

When the control unit 22 determines that no packet has been input from the subsystem 30 in S237, the control unit 22 determines whether or not a specific condition for a transition to the energy-saving state has been satisfied, for example, whether or not a specific state in which, for example, no operation is input via the operation unit 11 has continued for not less than a certain time period (S238).

When the control unit 22 determines that the specific condition has not been satisfied in S238, the control unit 22 executes the process of S237.

When the control unit 22 determines that the specific condition has been satisfied in S238, the control unit 22 performs a self-refresh process of migrating the data stored in its own RAM to the storage unit 21 (S239), then outputs a command for a transition to the energy-saving state to the subsystem 30 (S240), and ends the operations illustrated in FIG. 7. A command for a transition to be output to the subsystem 30 in S240 is a command for a transition on which a determination in S107 is to be made.

As described above, while the main system 20 is in the energy-saving state, if the subsystem 30 receives a main dedicated specific packet that is specific type data of main dedicated packets required to be processed by the main system 20 from an external apparatus, the MFP 10 causes the subsystem 30 to store the main dedicated specific packet in the intermediate buffer 17. Then, while the main system 20 is in the energy-saving state, if the subsystem 30 receives a main dedicated packet other than the main dedicated specific packet from an external apparatus, the MFP 10 causes the subsystem 30 to return the main system 20 to the normal state, and to cause the main system 20 to process the main dedicated specific packet stored in the intermediate buffer 17 and the main dedicated packet other than the main dedicated specific packet. Hence, even when the subsystem 30 receives a main dedicated packet required to be processed by the main system 20 from an external apparatus, if the received main dedicated packet is a main dedicated specific packet, the main system 20 does not have to be returned to the normal state immediately. Thus, the MFP 10 may reduce the number of times the main system 20 that is in the energy-saving state is returned to the normal state and maintain the energy-saving state for a long time to enhance energy-saving performance.

Furthermore, while the main system 20 is in the energy-saving state, if a main dedicated specific packet has been stored in the intermediate buffer 17 for more than a specific time period, the MFP 10 causes the subsystem 30 to return the main system 20 that is in the energy-saving state to the normal state and to cause the main system 20 to process the main dedicated specific packet stored in the intermediate buffer 17. Thus, the MFP 10 may prevent a situation in which the main dedicated specific packet stored in the intermediate buffer 17 has not been processed by the main system 20 for a long period of time from occurring.

Furthermore, if the main system 20 returns to the normal state based on an instruction from the subsystem 30, when a process for a main dedicated packet performed by the main system 20 ends, the main system 20 transitions to the energy-saving state again. Thus the MFP 10 may reduce a time period for which the main system 20 is in the normal state and increase a time period for which the main system 20 is in the energy-saving state to enhance energy-saving performance.

Furthermore, if the main system 20 returns to the normal state based on an instruction from the subsystem 30, a process for a main dedicated specific packet of processes for main dedicated packets performed by the main system 20 is to be performed on only a main dedicated specific packet stored in the intermediate buffer 17 at a point in time when the main system 20 returns to the normal state, and if the main system 20 is in the normal state, the subsystem 30 causes the intermediate buffer 17 to store a main dedicated specific packet received from an external apparatus. Thus, even if the subsystem 30 receives a main dedicated specific packet from an external apparatus after the main system 20 returns to the normal state based on an instruction from the subsystem 30, the MFP 10 enables the main system 20 to transition to the energy-saving state. Hence, the MFP 10 may reduce a time period for which the main system 20 is in the normal state and increase a time period for which the main system 20 is in the energy-saving state to enhance energy-saving performance.

In addition, in the embodiment, if the main system 20 is in the energy-saving state and the subsystem 30 receives a main dedicated packet other than a main dedicated specific packet from an external apparatus, when the MFP 10 causes the main system 20 having been returned to the normal state to process the main dedicated packet, the MFP 10 passes the main dedicated packet from the subsystem 30 to the main system 20 via the intermediate buffer 17. However, the MFP 10 may pass the main dedicated packet from the subsystem 30 directly to the main system 20 without involving the intermediate buffer 17.

Furthermore, in the embodiment, as examples of a communication protocol that the main system 20 can generate a response packet of, the ARP and the SNMP have been described. The main system 20 may be capable of generating a response packet of another communication protocol, or does not have to be capable of generating a response packet of the ARP or the SNMP, or response packets of both of them.

Furthermore, the electronic device of the present disclosure is an MFP in the embodiment, or alternatively, may be an image forming apparatus, such as a printer-specific machine, other than the MFP, or an electronic device other than the image forming apparatus.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An electronic device comprising:
   a main system that operates in (i) a normal state or (ii) an energy saving state, wherein energy consumed by the electronic device in the energy-saving state is less than energy consumed by the electronic device in the normal state;
   a data retaining unit that stores data;
   a network communication unit that communicates with an external apparatus; and
   a subsystem that:
     receives, via the network communication unit, a packet from an external apparatus;
     provides the received packet to the main system to process the received packet;
     receives a response packet generated by the main system as a result of processing the received packet;
     upon receiving the response packet, transmits the response packet to the external apparatus via the network communication unit;

determines whether the transmitted response packet corresponds to main dedicated data, wherein the main dedicated data is required to be processed by the main system;

based on determining that the transmitted response packet does not correspond to the main dedicated data, stores response generation information associated with the transmitted response packet in the data retaining unit, wherein the response generation information is used for generating the response packet to the received packet;

determines whether the transmitted response packet corresponds to a command to transition the main system from the normal state to the energy saving state, wherein the command is input from the main system to the subsystem; and based on determining that the transmitted response packet corresponds to the command to transition the main system from the normal state to the energy saving state, transitions the main system from the normal state to the energy saving state, wherein while the main system is in the energy saving state, if the subsystem receives a response packet that corresponds to main dedicated specific data that is a specific type of main dedicated data, the subsystem stores the main dedicated specific data in the data retaining unit.

2. An electronic device comprising:

a main system that operates in (i) a normal state or (ii) an energy saving state, wherein energy consumed by the electronic device in the energy-saving state is less than energy consumed by the electronic device in the normal state;

a data retaining unit that stores data;

a network communication unit that communicates with an external apparatus; and a subsystem that:

receives, via the network communication unit, a packet from an external apparatus;

provides the received packet to the main system to process the received packet;

receives a response packet generated by the main system as a result of processing the received packet;

upon receiving the response packet, transmits the response packet to the external apparatus via the network communication unit;

determines whether the transmitted response packet corresponds to main dedicated data, wherein the main dedicated data is required to be processed by the main system;

based on determining that the transmitted response packet does not correspond to the main dedicated data, stores response generation information associated with the transmitted response packet in the data retaining unit, wherein the response generation information is used for generating the response packet to the received packet;

determines whether the transmitted response packet corresponds to a command to transition the main system from the normal state to the energy saving state, wherein the command is input from the main system to the subsystem; and based on determining that the transmitted response packet corresponds to the command to transition the main system from the normal state to the energy saving state, transitions the main system from the normal state to the energy saving state, wherein:

while the main system is in the energy saving state, if the subsystem receives a response packet that does not correspond to main dedicated specific data that is a specific type of main dedicated data, the subsystem transitions the main system from the energy saving state to the normal state, and the subsystem causes the main system to process the main dedicated specific data stored in the data retaining unit.

3. An electronic device comprising:

a main system that operates in (i) a normal state or (ii) an energy saving state, wherein energy consumed by the electronic device in the energy-saving state is less than energy consumed by the electronic device in the normal state;

a data retaining unit that stores data;

a network communication unit that communicates with an external apparatus; and a subsystem that:

receives, via the network communication unit, a packet from an external apparatus;

provides the received packet to the main system to process the received packet;

receives a response packet generated by the main system as a result of processing the received packet;

upon receiving the response packet, transmits the response packet to the external apparatus via the network communication unit;

determines whether the transmitted response packet corresponds to main dedicated data, wherein the main dedicated data is required to be processed by the main system;

based on determining that the transmitted response packet does not correspond to the main dedicated data, stores response generation information associated with the transmitted response packet in the data retaining unit, wherein the response generation information is used for generating the response packet to the received packet;

determines whether the transmitted response packet corresponds to a command to transition the main system from the normal state to the energy saving state, wherein the command is input from the main system to the subsystem; and based on determining that the transmitted response packet corresponds to the command to transition the main system from the normal state to the energy saving state, transitions the main system from the normal state to the energy saving state, wherein while the main system is in the energy saving state, if the main dedicated specific data has been stored in the data retaining unit for more than a specific time period, the subsystem transitions the main system from the energy saving state to the normal state.

4. An electronic device comprising:

a main system that operates in (i) a normal state or (ii) an energy saving state, wherein energy consumed by the electronic device in the energy-saving state is less than energy consumed by the electronic device in the normal state;

a data retaining unit that stores data;

a network communication unit that communicates with an external apparatus; and a subsystem that:

receives, via the network communication unit, a packet from an external apparatus;

provides the received packet to the main system to process the received packet;

receives a response packet generated by the main system as a result of processing the received packet;

upon receiving the response packet, transmits the response packet to the external apparatus via the network communication unit;

determines whether the transmitted response packet corresponds to main dedicated data, wherein the main dedicated data is required to be processed by the main system;

based on determining that the transmitted response packet does not correspond to the main dedicated data, stores response generation information associated with the transmitted response packet in the data retaining unit, wherein the response generation information is used for generating the response packet to the received packet;

determines whether the transmitted response packet corresponds to a command to transition the main system from the normal state to the energy saving state, wherein the command is input from the main system to the subsystem; and based on determining that the transmitted response packet corresponds to the command to transition the main system from the normal state to the energy saving state, transitions the main system from the normal state to the energy saving state, wherein the subsystem after a predetermined length of time, performs a self-refresh process, and wherein the self-refresh process comprises:

migrating data stored in the control unit to a storage unit of the main system; and transitioning the main system from the normal state to the energy saving state.

5. An electronic device comprising:

a main system that operates in (i) a normal state or (ii) an energy saving state, wherein energy consumed by the electronic device in the energy-saving state is less than energy consumed by the electronic device in the normal state;

a data retaining unit that stores data;

a network communication unit that communicates with an external apparatus; and a subsystem that:

receives, via the network communication unit, a packet from an external apparatus;

provides the received packet to the main system to process the received packet;

receives a response packet generated by the main system as a result of processing the received packet;

upon receiving the response packet, transmits the response packet to the external apparatus via the network communication unit;

determines whether the transmitted response packet corresponds to main dedicated data, wherein the main dedicated data is required to be processed by the main system;

based on determining that the transmitted response packet does not correspond to the main dedicated data, stores response generation information associated with the transmitted response packet in the data retaining unit, wherein the response generation information is used for generating the response packet to the received packet;

determines whether the transmitted response packet corresponds to a command to transition the main system from the normal state to the energy saving state, wherein the command is input from the main system to the subsystem; and based on determining that the transmitted response packet corresponds to the command to transition the main system from the normal state to the energy saving state, transitions the main system from the normal state to the energy saving state, wherein transitioning from the normal mode to the energy saving mode includes causing a power supply of the main system to stop powering a control unit of the main system and a storage unit of the main system.

* * * * *